United States Patent
Godi et al.

(10) Patent No.: US 6,886,304 B1
(45) Date of Patent: May 3, 2005

(54) MULTI-LAYER SLAB PRODUCT MADE OF STONE GRANULATES AND RELATIVE MANUFACTURING PROCESS

(75) Inventors: Alessandro Godi, Verona (IT); Pierpaolo Tassone, Verona (IT)

(73) Assignee: Quarella S.p.A., Verona (IT)

( * ) Notice: Subject to any disclaimer, the term of this patent is extended or adjusted under 35 U.S.C. 154(b) by 315 days.

(21) Appl. No.: 10/069,294

(22) PCT Filed: Aug. 22, 2000

(86) PCT No.: PCT/EP00/08181

§ 371 (c)(1),
(2), (4) Date: Jun. 12, 2002

(87) PCT Pub. No.: WO01/14133

PCT Pub. Date: Mar. 1, 2001

(30) Foreign Application Priority Data

Aug. 26, 1999 (IT) .......................................... MI99A1835

(51) Int. Cl.⁷ .............................................. E04C 1/00
(52) U.S. Cl. ..................... 52/612; 52/311.1; 52/742.14; 52/81; 52/309.17; 52/596; 428/15; 428/35.4; 428/35.7; 264/69; 264/71; 264/256; 264/297.4
(58) Field of Search .......................... 52/309.17, 311.1, 52/742, 14, 81, 596, 600, 601, 612, 742.14; 428/15, 35.4, 35.7; 264/69, 71, 256, 297.4

(56) References Cited

U.S. PATENT DOCUMENTS

| | | | |
|---|---|---|---|
| 4,107,378 A | | 8/1978 | Bourguignon et al. |
| 4,185,055 A | * | 1/1980 | Barrilon et al. ............ 264/29.5 |
| 4,255,195 A | * | 3/1981 | Holter et al. ............. 106/18.12 |
| 4,348,452 A | | 9/1982 | Paolo et al. |
| 4,853,276 A | * | 8/1989 | Kurushima ................. 428/187 |
| 4,909,974 A | * | 3/1990 | Toncelli ....................... 264/71 |
| 4,911,138 A | * | 3/1990 | Leis ......................... 125/16.01 |
| 5,028,266 A | * | 7/1991 | Rettenmaier ............... 106/282 |
| 5,264,168 A | * | 11/1993 | Toncelli ...................... 264/658 |
| 5,280,051 A | * | 1/1994 | Traverso et al. ............ 523/171 |
| 6,127,458 A | * | 10/2000 | Sakai ......................... 523/220 |
| 6,627,315 B2 | * | 9/2003 | Sakai ......................... 428/406 |
| 6,713,015 B1 | * | 3/2004 | Toncelli et al. ............. 264/660 |

FOREIGN PATENT DOCUMENTS

| | | |
|---|---|---|
| FR | 2.136.862 | 12/1972 |
| GB | 2.224.283 | 5/1990 |

* cited by examiner

Primary Examiner—Carl D. Friedman
Assistant Examiner—Christy Green
(74) Attorney, Agent, or Firm—Young & Thompson

(57) ABSTRACT

The invention concerns a product and the relative manufacturing process, said product, including at least a precast support (2) of expanded material and at least a layer (3) of agglomerated stone material in form of granulates bound by a binding phase, over at least one surface of said expanded support (2). According to suitability, the product (1) is made by a sandwich structure with an intermediate layer of expanded material and two surface coatings of stone material. The product (1) can also have a complex or modular shape, from which it is possible to cut and eventually to work finished pieces of predetermined dimensions. The main advantage of the invention consists in obtaining a finished product (1, 10, 100) lighter than a product made of agglomerated stones homogeneous in the thickness.

20 Claims, 2 Drawing Sheets too high is due to the high specific weight of its components and one of the objects of the present invention is to avoid this drawback.

MULTI-LAYER SLAB PRODUCT MADE OF STONE GRANULATES AND RELATIVE MANUFACTURING PROCESS

BACKGROUND OF THE INVENTION

The present invention concerns a product in multi-layer composite slabs made of agglomerated stone materials and its relative manufacturing process.

The always greater difficulties and the growing cost necessary to obtain blocks or slabs of natural (such as marble, granite, etc.) or artificial (for example of ceramic type) stone materials by quarrying and subsequent manufacturing process, have suggested a technology to manufacture artificially such stone blocks, using granulates coming from these materials bound together by a binder which can be of inorganic type, and so belonging to the class of cement binders, or of organic type, being in this case a synthetic resin which can be cured by a chemical or thermal process.

DESCRIPTION OF THE RELATED ART

According to this already known technology, the mixture made of stone chips, in selected grain size and therefore of predetermined dimensions of the granulates or chips (from a maximum of 150 mm to powder size) and of binder (in addition to other additives, such as mixture reology modifiers or curing or adhesion promoters) is powdered in a mold and subjected to a process which mainly consists in the molding by vibro-compressure, i.e. simultaneous applying of a compacting pressure and of a vibration, both these phases under a predetermined vacuum, in order to avoid air entrapment into the mixture.

After the vibro-compressure under vacuum phase, the mixture is left to rest into the mold until the resin is completely cured (by addition of a suitable promoter) or the cement is hardened, binding irreversibly the granulates of stone material in a single bock.

Alternatively, avoiding the use of a mold, the mixture can be fed, according to convenience, on a molding belt, so assuming the shape of a slab, which after vibro-compressure and subsequent hardening does not need the sawing phase.

In this case the resin curing is obtained by a thermal reaction, warming the product, which hardens in a few minutes.

The manufacturing process is more convenient than the block molding technology and the production cycles are advantaged. Due to the fact that the sawing phase is not necessary, the slab, after the hardening phase, can be immediately supplied to the final working phase.

The resulting products show mechanical properties which make them particularly suitable, after the necessary working phases, for the manufacture of floorings, internal walling and external cladding of residential and public buildings, and of furniture components.

When a synthetic resin is used as binder, one of the main advantages is that the hardening phase requires very short time and the mechanical properties of the product are better than those of the corresponding cement bound products.

The disadvantage connected with the use of a synthetic resin is the high price of the resin, so that, also if it is used in a relatively small amount, the cost of a resin bound product is always high. On the contrary, when a cement binder is used, the main problem, in an industrial production, is connected with the long time required by the set and the subsequent hardening. Moreover, the final product is heavy, since high thickness must be used due to the poor mechanical resistance when compared to the resin bound products, mainly in the phase of installation as outdoor wall finishes.

Besides to these general aspect problems, there are other problems specifically connected to specific applications.

In the case of products for the manufacturing of components for furniture, for example, the high weight of the element represents a disadvantage both from the commercial, for the elevated transport cost, and from the performance point of view, for the difficulty of the installation.

In fact, a typical formulation for the production of agglomerated stones using the technology of the vibro-compressure under vacuum, for example in the more favourable case of use of polyester resin as binder, could comprise:

92% by weight of granulates and marble powder

8% by weight of polyester resin

Due to the fact that the granulates or the marble powder have an average specific weight of 2.7 kg/dm$^3$, and the polyester resin has an average specific weight of 1.1 kg/dm$^3$, the resulting product, for example in the size of 1 m$^2$ and 3 cm thickness, will have a theoretical specific weight of 2.57 kg/dm$^3$ (slightly higher than the experimental value which generally ranges between 2.49–2.50 kg/dm$^3$) corresponding to a weight of 77.1 kg which is too high in view of what mentioned.

FR-A-2.136.862 discloses a structure wherein an expanded, lightweight layer is directly bound by high temperature treatment to a surface layer having the same chemical composition of the expanded layer. No binding phase is accordingly present and this entails that the layers have to consist of the same material (silicate) so that chemical bonds can be formed during the high temperature vitrification/sinterization treatment.

U.S. Pat. No. 4,107,378 discloses a method and apparatus for manufacturing thin, flat lining plates having a two-layer structure. This document gives no teaching for obtaining a multi-layer structure different from the one described therein.

SUMMARY OF THE INVENTION

Object of the invention is mainly to avoid the disadvantage of the high weight of the products made of stone chips, manufactured by the technology of the vibro-compressure under vacuum, malting a product noticeably lighter and which maintains substantially the technical and aesthetical properties of the above mentioned products.

This objective is obtained, according to the invention, as disclosed below.

Advantageous applications of the present invention are disclosed below.

Mainly, the product according to the invention, has two surface layers obtained by vibro-compressure, consisting of an agglomerate, for example obtained from marble powder chips bound by polyester resin, and a precast support, for example obtained again by vibro-compressure under vacuum, consisting of chips of expanded clay bound by polyester resin.

Preferably, the product according to the invention has a sandwich structure, where the expanded clay precast support makes up the intermediate layer, and two surface layers of agglomerate provided, one on the top and one under the FR-A-2.136.862 discloses a structure wherein an expanded, lightweight layer is directly bound by high temperature treatment to a surface layer having the same chemical composition of the expanded layer. No binding phase is accordingly present and this entails that the layers have to consist of the same material (silicate) so that chemical bonds can be formed during the high temperature vitrification/sinterization treatment.

U.S. Pat. No. 4,107,378 discloses a method and apparatus for manufacturing thin, flat lining plates having a two-layer structure. This document gives no teaching for obtaining a multi-layer structure different from the one described therein. intermediate layer.

It has been experimentally shown that an agglomerate of expanded clay bound by polyester resin can reach a specific weight lower than 1 kg/dm$^3$.

Therefore, a laminated composite product, with a sandwich structure according to the invention, 1 m$^2$ of a size and 3 cm in thickness, as in the example above described, containing an upper surface layer and a lower surface layer, both of them of 0.5 cm of agglomerated marble, and an intermediate layer of 2 cm of agglomerated expanded clay, will have a total weight of 45.7 kg.

Such a product results therefore noticeably lighter than a product with the same dimensions, made of agglomerated stone but homogeneous in thickness.

The product in multi-layer composite slabs, according to the invention, can also be realised with at least a perimetral edge, suitably shaped, in stone material.

Advantageously, the product according to the invention can also be manufactured in form of complex element comprising a plurality of modular elements with a sandwich structure, connected each other by layers of stone chips material, in order that the single moduli can be, when necessary, separated one from the other by cutting and optionally finished to obtain the wished edge shape.

BRIEF DESCRIPTION OF THE DRAWINGS

Further characteristics of the invention will be evident from the following description, referred to embodiments given by way of an example, shown in the attached figures, where.

DESCRIPTION OF THE PREFERRED EMBODIMENTS

Figure 1:
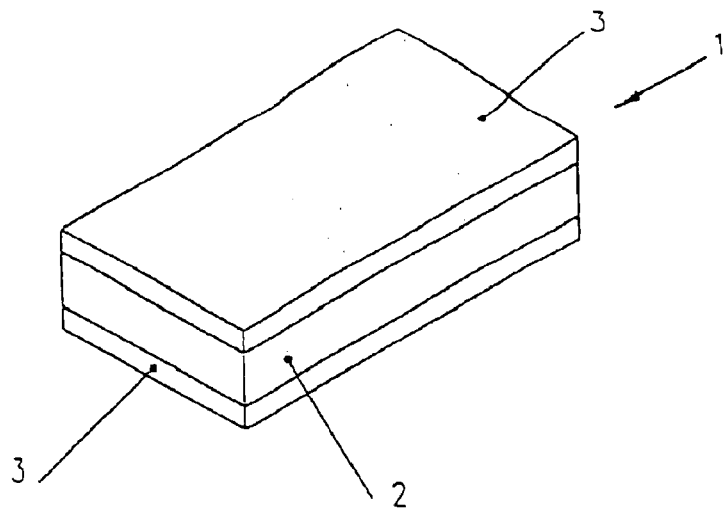
FIG. 1 is an axonometric schematic view of a product with a sandwich structure according to the invention.

FIG. 1 shows a product (1) according to the invention, having a sandwich structure, including an intermediate support layer (2) with a relatively low specific weight, (e.g. consisting of expanded clay), and two surface layers, upper and lower, indicated with the same reference number (3), consisting of stone chips.

Optionally, the product (1) could exclude the lower layer (3).

Figure 4:
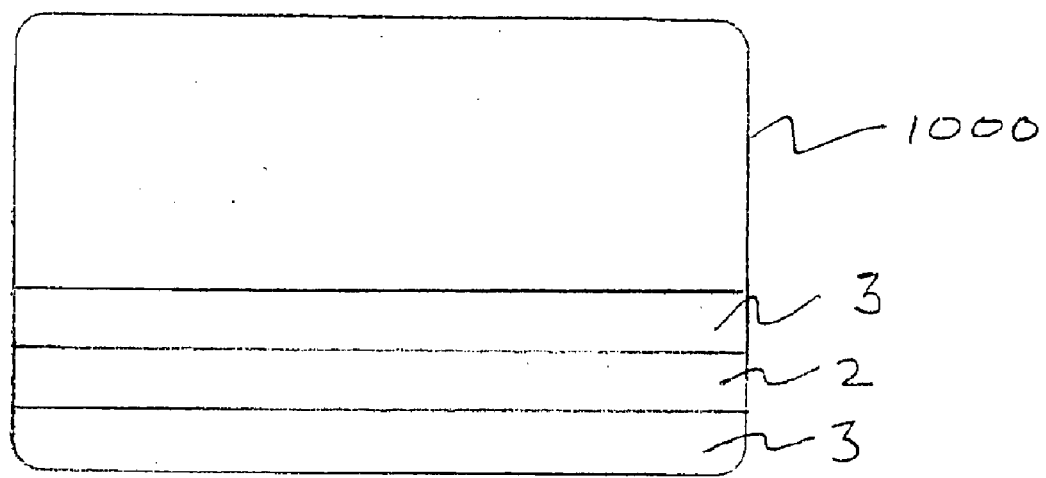
FIG. 4 is a view of the product being molded under vibro-compressure under vacuum.

The product (1) of FIG. 1 is obtained, according to convenience, by the technique of vibro-compressure under vacuum. See FIG. 4 showing surface layer 2 and intermediate layer 3 being concurrently molded by vibro-compressure under vacuum within device 1000. Particularly, the intermediate layer is a precast of expanded clay chips bound with polyester resin obtained by the above mentioned technique of vibro-compressure under vacuum, on the upper and lower surfaces of which, the surface layers (3) consisting of an agglomerate, for example obtained from marble powder chips bound with polyester resin, are mold, e.g. by said vibro-compressure method.

Due to the fact that the larger part of the product (1) thickness is occupied by the intermediate support layer (2), in expanded clay, the total weight of the product results noticeably lower than the weight of a product of corresponding size made of agglomerated stone, homogeneous in thickness, as clearly shown in the above mentioned example.

Figure 2:
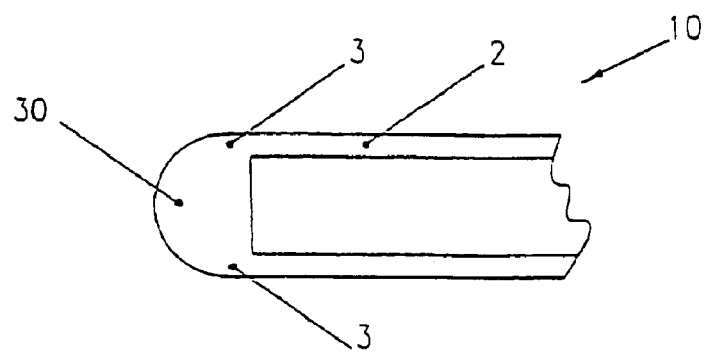
FIG. 2 is a view in partial section of the product shown in FIG. 1, but with a lateral edge in stone chip material.

The product (10) of FIG. 2 differs from that of FIG. 1 for the presence of a lateral edge (30) in the same stone material of the surface layers (3).

Figure 3:
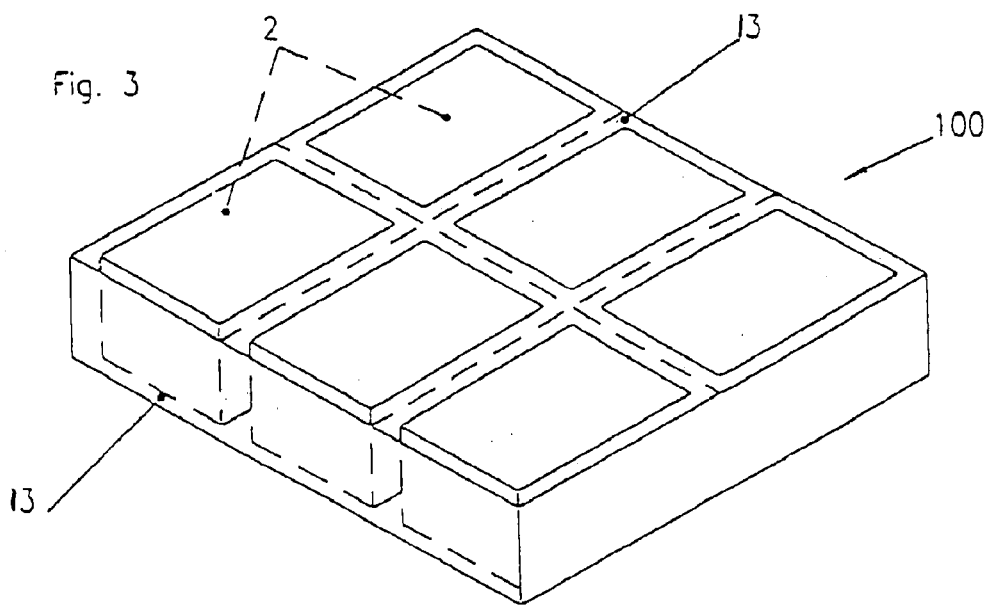
FIG. 3 is a view in axonometry of a complex or modular product, from which it is possible, for example, to obtain by cutting and subsequent finishing, single or edged elements, such as that shown in FIG. 2.

FIG. 3 schematically shows a complex product (100) of modular type, containing a plurality of intermediate support layers (2), in expanded clay, regularly positioned and completely immersed in surrounding agglomerated stone layers (13), which distributes therefore also in the spaces among the intermediate support layers (2).

In this way, it is possible to obtain a modular product, from which it is possible to cut elements with the wished number of moduli, both in the longitudinal and the transverse direction sense, according to the needs.

The slab cut following some of the shaded lines in FIG. 3 can be subsequently finished to obtain for example the edging (30) shown in FIG. 2.

The advantages are evident from the above description, the scope of the invention being determinated by the content of the annexed claims.

EXAMPLE

An example of manufacturing process of a product according to the invention typically includes the following phases:

molding by vibro-compressure under vacuum of a block made of expanded clay chips, of a selected grain size, bound by the minimum requested amount of polyester resin;

hardening of the block via a chemical reaction by curing at room temperature; sawing of the block in slabs of predetermined thickness and subsequent slab surface gauging;

perimetral finishing of the agglomerated slabs in expanded clay for working them, if requested, to the wished shape;

mixing of a mixture of stone chips in the selected grain size, powder and binder in the typical proportions required for the manufacturing of an agglomerate (the stone chips can be suitable made of marble, granite, quartz, or other inert materials);

distribution of the required amount of mixture on a molding belt, to mold the first lower layer of the composite;

positioning, according to convenience, of expanded clay over this first layer of the slab;

distribution on the slab of expanded clay of a further amount of mixture, suitable to make the upper layer of the composite;

molding by vibro-compressure under vacuum, in a single step, of the layers of the prepared composite;

hardening of the mixture via thermal reaction;
surface and perimetral finishing of the mold product, as desired.

What is claimed is:

1. A process for the preparation of a multi-layer composite slab product, comprising
   first and second dense layers of stone material agglomerate and binding agent; and
   an expanded material layer in direct contact with the first and second layers and intermediate the first and second layers,
   the first and second dense layers being surface layers, and
   the expanded material layer being less dense than each of the first and second dense layers
   comprising the following steps:
     distribution of a stone material agglomerate together with a binding agent in a mold or on a molding belt to form a first, lower layer of the product;
     prior to any vibro-compression, positioning on said first layer at least one pre-cast support made of expanded agglomerate and a binding agent to form an intermediate layer of the product;
     distribution of a further stone material agglomerate together with a binding agent on said at least one pre-cast layer to form at least a second, upper layer of the product;
     vibro-compression, in a single step, of said stone material agglomerates and binding agents and of said at least one pre-cast support; and
     hardening of the mixture via thermal reaction.

2. A process according to claim 1, wherein said at least one precast support (2) comprises expanded clay granules bound with polyester resin.

3. A multi-layer composite slab, comprising:
   first and second dense layers of a first material agglomerate and a first binding agent; and
   an expanded material layer in compressive direct contact with the first and second layers and intermediate the first and second layers, the second layer being of an expanded material agglomerate and a second binding agent,
   the first and second dense layers being surface layers, and
   the expanded material layer being less dense than each of the first and second dense layers.

4. The slab of claim 3, further comprising a perimeter edge surface that exposes each of the first and second dense layers and the expanded material layer.

5. The slab of claim 3, further comprising a perimeter lateral edge surface that completely conceals the expanded material layer.

6. The slab of claim 3, further comprising:
   further dense layers of the first material agglomerate and the first binding agent; and
   further expanded material layers,
   each of the expanded material layers being in contact with and intermediate two of the dense layers.

7. The slab of claim 5, further comprising:
   further dense layers of the first material agglomerate and the first binding agent; and
   further expanded material layers,
   each of the expanded material layers being in contact with and intermediate two of the dense layers,
   the perimeter lateral edge surface of each expanded material layer being completely concealed by the perimeter lateral edge surface.

8. The slab of claim 3, wherein,
   the first material agglomerate is stone chips,
   the first binding agent is polyester resin,
   the expanded material agglomerate is expanded clay, and
   the second binding agent is polyester resin.

9. The slab of claim 3, wherein,
   the first material agglomerate is marble powder chips, and
   the first binding agent is polyester resin.

10. The slab of claim 9, wherein,
    the expanded material agglomerate is expanded clay.

11. The slab of claim 10, wherein,
    the second binding agent is polyester resin.

12. The slab of claim 3, wherein the specific weight of the expanded material layer is lower than 1 kg/dm$^3$.

13. The slab of claim 3, wherein,
    slab has a 1 square meter area and a 3 centimeter thickness,
    each of the first and second surface dense layers are having a 0.5 thickness,
    the expanded material layer has a thickness of 2 cm, and
    the slab has a total weight of 45.7 kg.

14. The slab of claim 12, wherein,
    slab has a 1 square meter area and a 3 centimeter thickness,
    each of the first and second surface dense layers are having a 0.5 thickness,
    the expanded material layer has a thickness of 2 cm, and
    the slab has a total weight of 45.7 kg.

15. A method of preparing a multi-layer composite slab product, comprising the steps of:
    surrounding a pre-cast support made of an expanded agglomerate and a first binding agent within a mixture of stone agglomerates and second binding agent; and
    vibro-compressing, in a single step, the mixture of stone material agglomerates and second binding agent, wherein
    a multi-layer composite slab is formed comprising
    first and second dense layers of the stone material agglomerates and second binding agent sandwiching the pre-cast support,
    the pre-cast support being an expanded material layer in direct contact with the first and second layers and intermediate the first and second layers,
    the first and second dense layers being surface layers, and
    the expanded material layer being less dense than each of the first and second dense layers.

16. The method of claim 15, wherein the method forms the slab comprising a perimeter edge surface that exposes each of the first and second dense layers and the expanded material layer.

17. The method of claim 16, wherein the method forms the slab comprising a perimeter lateral edge surface that completely conceals the expanded material layer.

18. The method of claim 15, wherein the method forms the slab comprising:
    further dense layers-of the stone material agglomerate; and
    further expanded material layers,
    each of the expanded material layers being in contact with and intermediate two of the dense layers,
    the stone material agglomerate is marble chips,
    the first and second binding agents are polyester resin, and the expanded material agglomerate is expanded clay.

19. The method of claim 15, wherein the pre-cast support has a specific weight of lower than 1 kg/dm$^3$.

20. The method of claim 15, wherein the method forms the slab with each of the first and second surface dense layers having a first thickness, and the expanded material layer having a second thickness four times greater than the first thickness.

* * * * *